Figure 1:
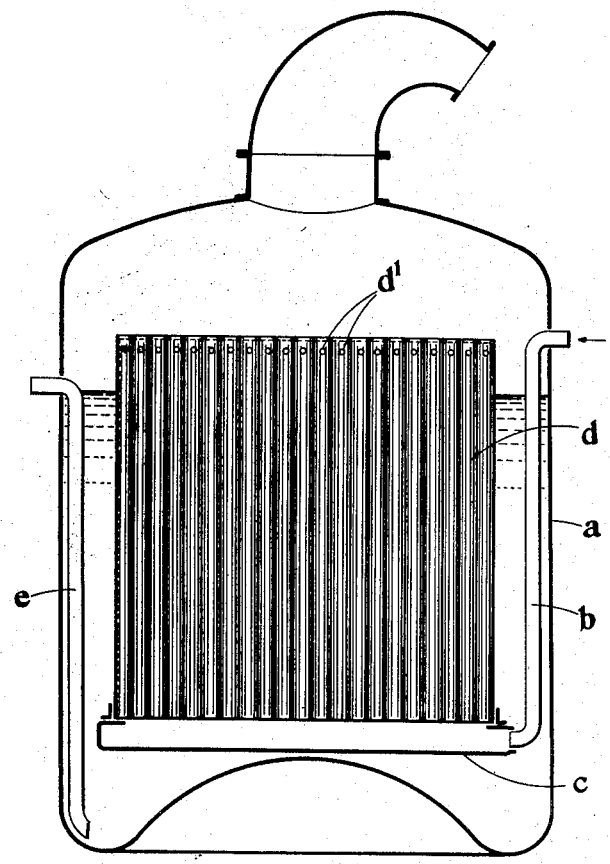

Patented Jan. 18, 1927.

1,614,483

UNITED STATES PATENT OFFICE.

JOHN LEWIS MAJOR, OF LONDON, AND BENJAMIN TAYLOR, OF BILSTON, ENGLAND.

DISTILLATION OR EVAPORATION OF LIQUIDS.

Application filed January 23, 1925, Serial No. 4,254, and in Great Britain February 7, 1924.

This invention relates to the distillation or evaporation of liquids, and is of especial application for the distillation of such liquids as tar and crude petroleum.

The invention relates to improvements in or modifications of the method and apparatus of the prior Patent No. 1,415,667.

According to the method of the prior patent the liquid is fed to a still in streams through a plurality of pipes extending from the bottom up through the liquid in the still under conditions in which the liquid gradually acquires the temperature necessary for the distillation to be effected or commenced, before passing into the body of liquid in the still, and then passes to the upper part of the still where the lighter vapours are disengaged for their removal from the still, the liquid then passing into the body of liquid in the still for further evaporation.

According to the present invention the liquid is fed through the body of liquid in the still through substantially vertical conduits of a relatively narrow cross-section, but of a relatively considerable width, that is to say, through conduits of a substantially oblong cross-section, and these conduits may have any desired width. For example where the conduits of oblong cross-section are disposed parallel, these may have a variable width so as to extend across the still, or the conduits may be provided of a uniform width and may be disposed in respective series in alignment, or they may be radially or otherwise disposed with reference to the centre of the still. At the lower end the respective conduits may be connected to or mounted upon a casing or casings or upon a tube or tubes through which the liquid to be distilled or evaporated is supplied and from which the liquid may pass upwardly through the conduits to discharge at the upper ends thereof. The upper ends of the conduits may be disposed at the same level and advantageously above the normal level of the main body of liquid in the still, or the upper ends of the conduits may be connected to a tray in the manner described in the specification of the prior patent aforesaid.

The upper ends of the conduits instead of being open may be closed and the conduits may be provided with holes near their upper ends through which the liquid on flowing up the conduits may pass outwardly into the bulk of liquid in the still.

All the conduits may be connected to a single casing or pipe, but groups or series of the conduits may be connected to separate casings or pipes so as to facilitate the removal of the conduits when it is necessary to clean or to repair the still and the liquid to be distilled or evaporated may be directly supplied to the separate casings or the separate casings may be connected in series and the liquid to be distilled or evaporated fed thereto from one supply pipe and the casings or pipes through which the liquid passes to the conduits may be supported on the bottom of the still by means of a supporting frame or feet of appropriate form and disposition.

The vertical conduits may be conveniently made from metal sheets or plates or from castings and with a view to increase the area, the plates may be provided of a corrugated sectional form in which the alternate ridges and grooves are disposed vertically or horizontally. Corrugated plates of such a form may be connected together to form a conduit, the respective plates being applied in position opposite to each other, so that the inner face of one is opposed to the inner face of the other, and thus the concavity of the furrows of one plate is opposed to the concavity of the furrows of the opposite plate. The plates are advantageously so disposed that the opposed ridges do not contact and the terminal edges at each side of the plates are advantageously secured together by suitably forming their edges so as to overlap and by securing the plates together at their overlapping edges by mechanical or other means or by integral flanges oppositely and coincidentally disposed. It will, however, be understood that the conduits may be cast alone or together with a transversely disposed casing or pipe or a section thereof.

The conduits may be secured to the casings before referred to by being fitted into recesses therein provided for their reception or instead they may be connected by means of one or other number of short lengths of pipe where they are not integrally provided in the manner described, or they may be connected by flanges or by any other convenient method.

It will be understood that although it is preferred to form the casings of a corrugated section in the manner described, these casings may be provided of a plain oblong section or of any other similar section such as an oval or a parabolic section or one approximating such a sectional form.

Figure 2:
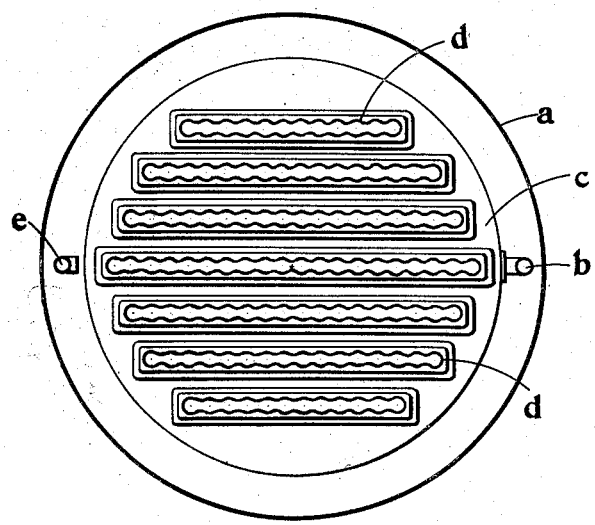
Figure 5:
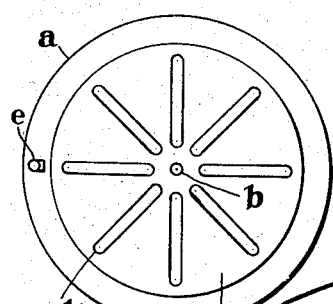
Figure 3:
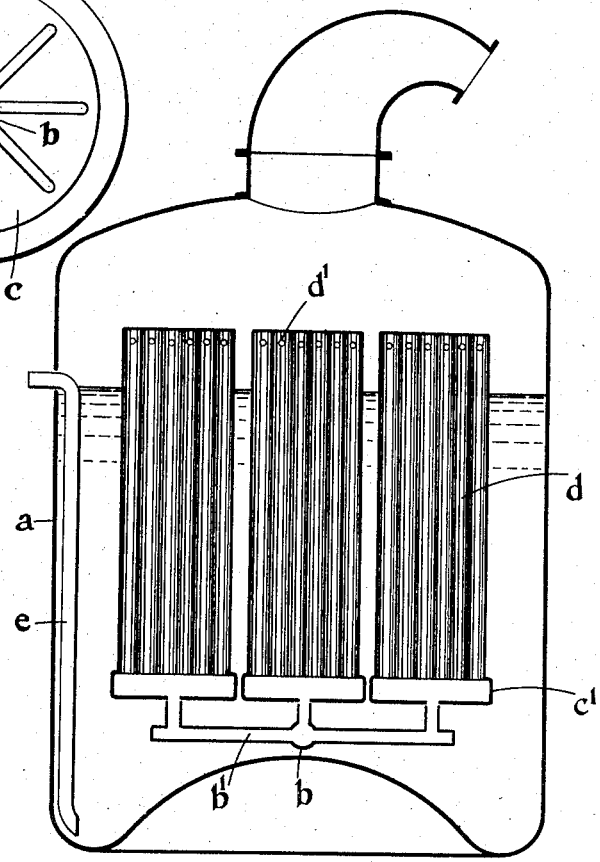
Figure 4:
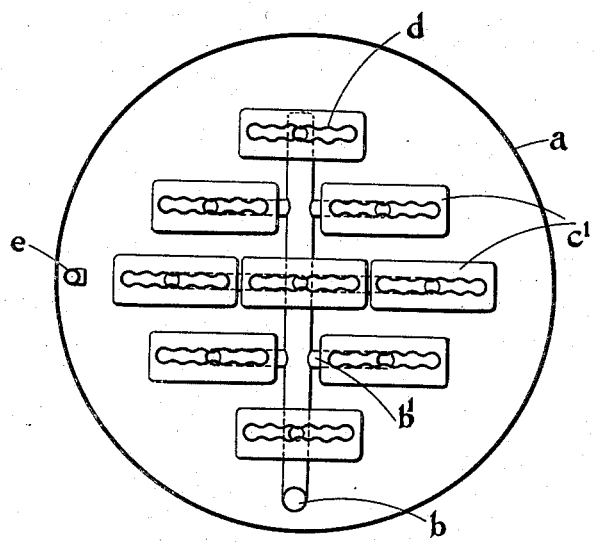

The invention is diagrammatically illustrated and by way of example in the accompanying drawings, in which Figure 1 represents a diagrammatic sectional elevation of a still provided with feed conduits for the liquid according to the invention, Figure 2 is a corresponding diagrammatic sectional plan, Figure 3 represents a diagrammatic sectional elevation of a still provided with a modified arrangement of feed conduits according to the invention, Figure 4 is a diagrammatic sectional plan corresponding to Figure 3, and Figure 5 is a diagrammatic sectional plan representing a further modification of the arrangement and form of the feed conduits.

In carrying the invention into effect in the construction of a still for the distillation, for example, of tar, as illustrated in Figures 1 and 2 of the accompanying diagrammatic drawings, the cylindrical still $a$ is provided with a feed pipe $b$ which passes downward through the body of liquid in the still and delivers the liquid continuously into a shallow circular casing $c$ upon which is mounted a series of vertical feed conduits $d$ of substantially oblong cross-section and with corrugated lateral walls, and of varied widths, according to the position in the still which they respectively occupy. They extend upwardly through the liquid in the still and have their upper ends disposed in a position above the level of the liquid. The ends are closed and the discharge of the liquid into the still is effected by way of orifices $d^1$ provided in the lateral walls near the closed upper ends. The discharge of the liquid from the still is effected by way of the pipe $e$.

In the modified construction illustrated in Figures 3 and 4, the vertical feed conduits $d$ are provided of uniform width and, where necessary, are mounted in alignment, in series of two or more conduits, to occupy the width of the still. Each of the conduits $d$ is mounted upon a corresponding casing $c^1$ and the said casings are respectively connected directly, or by branch feed pipes $b^1$, to the feed pipe $b$, the lower portion of which extends horizontally across the still $a$.

In the construction represented in Figure 5 of the drawings, the vertical feed conduits $d$, which again are of uniform width, are provided of plain oblong cross-section and are radially disposed in the still upon a common casing $c$, as in the construction represented by Figures 1 and 2, the feed pipe $b$ being connected to the said casing at the centre.

We claim:

1. In the distillation and evaporation of liquids, a method of feeding the liquid into the still consisting in passing the liquid in a plurality of streams of relatively narrow but substantially oblong cross-section through the body of the liquid in the still, the streams discharging above the body of liquid in the still and passing therein, substantially as described.

2. A still for the distillation and evaporation of liquids, having a plurality of feed conduits of relatively narrow and substantially oblong cross-section immersed in the body of the liquid in the still and communicating with a common feed pipe, the outlets for the discharge of the liquid from the said conduits being above the level of liquid in the still, substantially as described.

3. A still for the distillation and evaporation of liquids, as set forth in claim 2, wherein the feed conduits are mounted upon a common casing into which a feed pipe discharges and from which the liquid passes to the feed conduits, substantially as described.

4. A still for the distillation and evaporation of liquids, as set forth in claim 2, wherein the feed conduits are mounted upon casings which are common to a number of feed conduits through which casings the liquid passes to the feed conduits, each casing communicating with a feed pipe, substantially as described.

5. A still for the distillation and evaporation of liquids, as set forth in claim 2, wherein the feed conduits have walls of corrugated or undulatory form, substantially as described.

6. A still for the distillation and evaporation of liquids, as set forth in claim 2, wherein the feed conduits are provided with closed ends, substantially as described.

JOHN LEWIS MAJOR.
BENJAMIN TAYLOR.